United States Patent
Quirk (10) Patent No.: US 10,200,288 B2
(45) Date of Patent: Feb. 5, 2019

(54) SHAPING DATA TRAFFIC WITHIN A LOCAL AREA NETWORK

(71) Applicant: Xerox Corporation, Norwalk, CT (US)

(72) Inventor: Matthew J. Quirk, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 135 days.

(21) Appl. No.: 14/974,519

(22) Filed: Dec. 18, 2015

(65) Prior Publication Data

US 2017/0180260 A1    Jun. 22, 2017

(51) Int. Cl.
*H04L 12/815* (2013.01)
*H04L 12/28* (2006.01)
*H04L 12/725* (2013.01)
*H04L 29/06* (2006.01)

(52) U.S. Cl.
CPC .......... *H04L 47/22* (2013.01); *H04L 12/2854* (2013.01); *H04L 45/302* (2013.01); *H04L 65/102* (2013.01)

(58) Field of Classification Search
CPC ... H04L 47/22; H04L 12/2854; H04L 45/302; H04L 65/102; H04L 12/66; H04L 63/10; H04L 41/5003; H04L 41/5019; H04L 47/10; H04L 47/20; H04L 47/24; H04L 63/0263; H04L 65/80; H04L 12/14; H04L 12/2801; H04L 41/0986; H04L 47/13; H04L 47/2441; H04L 12/4645; H04L 47/2433; H04L 47/805; H04L 67/322; H04L 12/2803; H04L 29/06224; H04L 47/31; H04L 41/0893; H04L 12/4641; H04L 41/0896; H04L 47/32; H04L 67/306; H04W 88/16; H04W 84/12; H04W 28/0289

See application file for complete search history.

(56) References Cited

U.S. PATENT DOCUMENTS

| | | | | |
|---|---|---|---|---|
| 2004/0064575 | A1* | 4/2004 | Rasheed | H04L 67/322 709/232 |
| 2008/0291930 | A1* | 11/2008 | Damola | H04W 76/022 370/401 |
| 2009/0285225 | A1* | 11/2009 | Dahod | H04L 47/10 370/401 |
| 2013/0007831 | A1* | 1/2013 | Wu | H04N 21/23655 725/116 |
| 2013/0167196 | A1* | 6/2013 | Spencer | H04W 8/22 726/3 |
| 2013/0227118 | A1* | 8/2013 | Simen | H04L 67/24 709/224 |
| 2013/0312046 | A1* | 11/2013 | Robertson | H04N 21/00 725/93 |

(Continued)

*Primary Examiner* — Paul H Masur
*Assistant Examiner* — Michael K Phillips (57) ABSTRACT

A method, non-transitory computer readable medium and apparatus for shaping data traffic in a local area network (LAN) are disclosed. For example, the method includes receiving data traffic information from one or more sensors of a plurality of network elements within the LAN, determining that a data traffic shaping action is required based on a comparison of the data traffic information to one or more rules stored in a rules engine and transmitting a control signal to a gateway to configure the gateway to process the data traffic in accordance with the data traffic shaping action.

11 Claims, 4 Drawing Sheets

(56) References Cited

U.S. PATENT DOCUMENTS

| | | | |
|---|---|---|---|
| 2014/0095706 A1* | 4/2014 | Raleigh | H04L 41/0893 709/224 |
| 2015/0016247 A1* | 1/2015 | Hayes | H04L 47/127 370/230 |
| 2015/0055466 A1* | 2/2015 | Chen | H04L 47/2491 370/231 |
| 2015/0072641 A1* | 3/2015 | Raleigh | G06Q 30/016 455/406 |
| 2015/0236965 A1* | 8/2015 | Short | H04L 47/25 709/233 |
| 2016/0364580 A1* | 12/2016 | Tumuluru | G06F 21/6245 |

\* cited by examiner

SHAPING DATA TRAFFIC WITHIN A LOCAL AREA NETWORK

The present disclosure relates generally to shaping data traffic and, more particularly, to an apparatus and method for shaping data traffic within a local area network.

BACKGROUND

Data packets are prioritized and controlled in wide area networks (WANs). Typically, control of data packets in a WAN over large networks is a complicated process that is expensive and time consuming. A network engineer may configure various network elements to apply a particular Quality of Service (QoS) to data packets and prioritize transmission of the data packets accordingly.

However, individuals or companies in a small office or home office network environment do not have the finances, time or expertise to implement the same data packet control used for WANs. For example, hiring a traffic engineer to configure each network element within a LAN may be cost prohibitive.

SUMMARY

According to aspects illustrated herein, there are provided a method, non-transitory computer readable medium and apparatus for shaping data traffic in a local area network (LAN). One disclosed feature of the embodiments is a method that receives data traffic information from one or more sensors of a plurality of network elements within the LAN, determines that a data traffic shaping action is required based on a comparison of the data traffic information to one or more rules stored in a rules engine and transmits a control signal to a gateway to configure the gateway to process the data traffic in accordance with the data traffic shaping action.

Another disclosed feature of the embodiments is a non-transitory computer-readable medium having stored thereon a plurality of instructions, the plurality of instructions including instructions which, when executed by a processor, cause the processor to perform operations that receive data traffic information from one or more sensors of a plurality of network elements within the LAN, determine that a data traffic shaping action is required based on a comparison of the data traffic information to one or more rules stored in a rules engine and transmit a control signal to a gateway to configure the gateway to process the data traffic in accordance with the data traffic shaping action.

Another disclosed feature of the embodiments is an apparatus comprising a processor and a computer-readable medium storing a plurality of instructions which, when executed by the processor, cause the processor to perform operations that receive data traffic information from one or more sensors of a plurality of network elements within the LAN, determine that a data traffic shaping action is required based on a comparison of the data traffic information to one or more rules stored in a rules engine and transmit a control signal to a gateway to configure the gateway to process the data traffic in accordance with the data traffic shaping action.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for shaping data traffic in a local area network (LAN). As discussed above, individuals or companies in a small office or home office network environment do not have the finances, time or expertise to implement the same data packet control used for WANs. For example, hiring a traffic engineer to configure each network element within a LAN may be cost prohibitive.

Embodiments of the present disclosure provide a rules based QoS system for shaping data traffic in a LAN that is economical for individual users and small businesses. The rules may be stored in a rules engine and may be used to automatically and dynamically configure a gateway in the LAN that controls inbound and outbound data traffic at the edge of the LAN.

Figure 1:
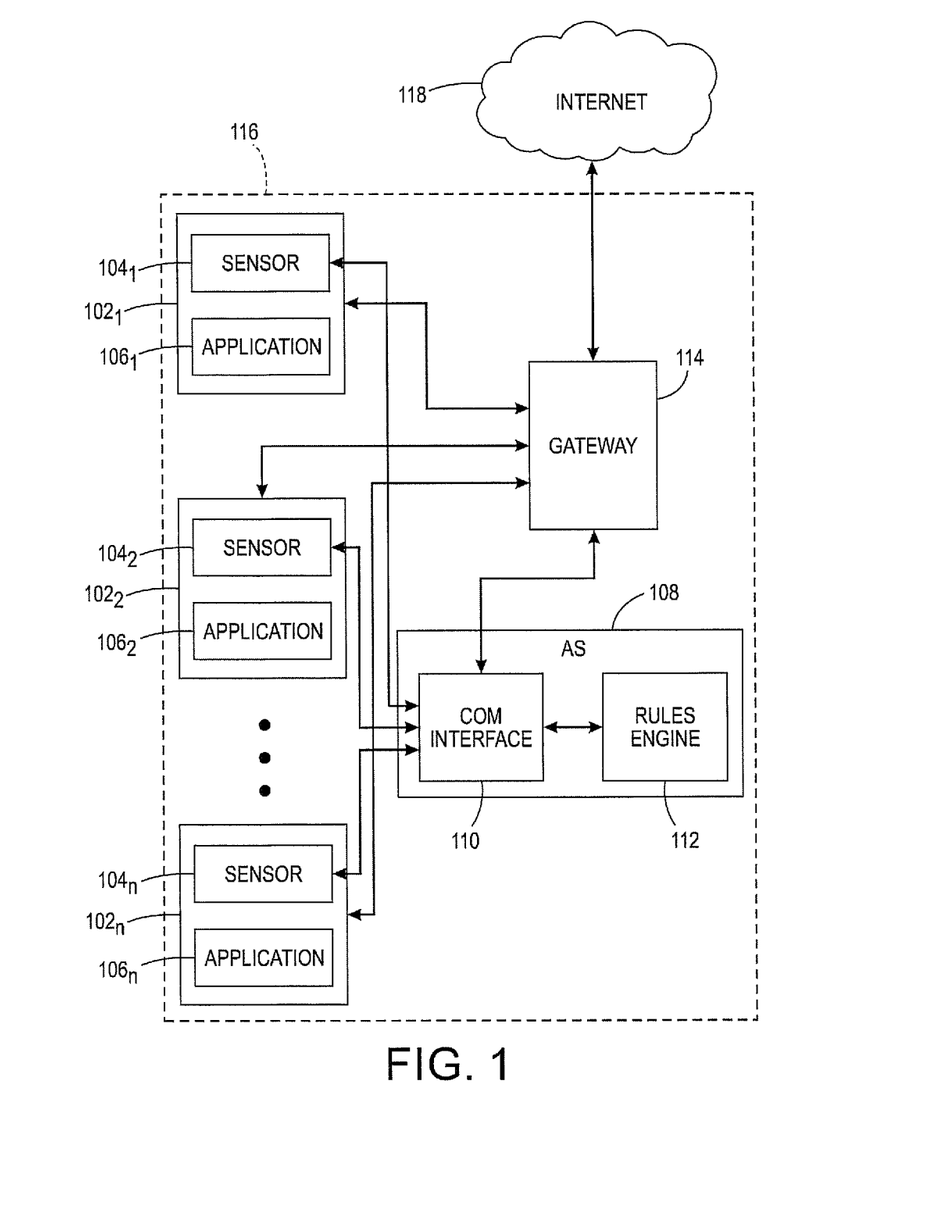
FIG. 1 illustrates an example block diagram of a communication network of the present disclosure.

FIG. 1 illustrates an example communication network 100 of the present disclosure. In one embodiment, the communication network 100 may include a local area network (LAN) 116. In one embodiment, the LAN 116 may include one or more endpoints $102_1$ to $102_n$ (also referred to individually as endpoint 102 or collectively as endpoints 102). Each endpoint $102_1$ to $102_n$ may have a respective sensor $104_1$ to $104_n$ (also referred to individually as sensor 104 or collectively as sensors 104) and run a respective application $106_1$ to $106_n$ (also referred to individually as application 106 or collectively as applications 106).

In one embodiment, the sensors 104 may each be deployed as a combination of hardware and software that is used to track data packets generated by the respective endpoint 102. The sensors 104 may keep count of the total bandwidth used by each endpoint 102 and each application 106 on a respective endpoint 102. In addition, the sensors 104 may mark the data packets from each respective endpoint 102. In one embodiment, "marking" the data packet may include adding data traffic information associated with the data packet, such as for example, a type of application that generated the data packet, an IP address of the endpoint that generated the data packet, a size of the data packet, and the like.

In one embodiment, two or more of the applications $106_1$ to $106_n$ may be different. In one embodiment, the applications $106_1$ to $106_n$ may be applications run in different departments of a retailer. For example, the application $106_1$ may be a photo generation application at a pharmacy, the application $106_2$ may be a prescription order application at the pharmacy, and the like.

In one embodiment, the applications $106_1$ to $106_n$ may be different applications at a home location of a user. For example, the application $106_1$ may be a video viewing application, the application $106_2$ may be an online video game application, a remote log-in application for work, and the like.

In one embodiment, the endpoints $102_1$ to $102_n$ may be any type of endpoint that can transmit data packets over the Internet via a wired or wireless connection. For example, the endpoints 102 may be a mobile telephone, a smart phone, a desktop computer, a laptop computer, a video game system, a multi-function device, a photo printer, a home security endpoint device, and the like.

In one embodiment, the LAN 116 may also include an application server (AS) 108 and a gateway 114. In one embodiment, the AS 108 may be a dedicated computer that performs the methods and functions for shaping data traffic in an LAN, as described herein. The AS 108 may include a processor and a memory storing instructions that are executed by the processor to perform the functions described herein. One example implementation of the AS 108 is illustrated below in FIG. 4.

In one embodiment, the AS 108 may include a communication (COM) interface 110 and a rules engine 112. In one example, the COM interface 110 may be capable of establishing either a wired or wireless communication path between the endpoints 102 and the gateway 114. In one embodiment, the COM interface 110 may communicate with a respective sensor 104 of each one of the endpoints 102.

In one embodiment, the AS 108 may receive data traffic information from the sensors 104 of each one of the endpoints 102. The data traffic information may be compared against rules stored in the rules engine 112 to determine the data traffic shaping action that corresponds to the data traffic information.

The rules engine 112 may be pre-defined with a set of traffic shaping action rules for a particular retailer, customer, user, and the like. In other words, the rules engine 112 may be customized for a particular customer. Said yet another way, the rules engine 112 may be pre-defined with a set of rules that are associated with a profile specific to an intended use (e.g., an intended business use, an intended home use, and the like). In other words, the set of rules of the rules engine 112 may be different for each customer to meet the business needs or personal needs of the customer.

In one embodiment, the AS 108 may include a graphical user interface (GUI) to allow a network engineer or user to include the rules that are customized for the particular customer. Alternatively, the AS 108 may include a GUI that has a series of questions that can be answered by the particular customer. The answers to the questions may then be used to automatically create the rules in the rules engine 112 that are customized for the particular user.

In one embodiment, the rules engine 112 may be a Jess based rules engine. In one embodiment, a Rete algorithm may be used by the rules engine 112 to efficiently search the rules engine for the traffic shaping action associated with the data traffic information. Once a match is found in the rules engine 112, the AS 108 may send a control signal to the gateway 114 to configure the gateway 114 to process data packets from the endpoints 102 in accordance with the traffic shaping action that is associated with the data traffic information.

One example of a rule may be when a data traffic from a particular endpoint exceeds a throughput monitor threshold, then reduce the priority of data traffic from the particular endpoint. For example, a user may share a LAN with other tenants in an apartment building or other family members in a house. To prevent a particular user from monopolizing the bandwidth, one of the rules may implement a bandwidth limit on any user.

Another example of a rule may be during a particular time of day to prioritize data traffic from a particular endpoint device. For example, a user may own and pay for the data services that is shared in a building and want priority over other tenants or family members. As a result, the user may come home between the hours of 6:00 PM and 8:00 PM and want priority over other users. Thus, when data traffic information is received with time stamps indicating that the time is now between 6 PM and 8 PM, the traffic from a particular endpoint (e.g., identified via a IP address, port number, MAC identification of the user's endpoint) may be prioritized over all other traffic.

In another example, a rule may be when data traffic from a particular department of a retailer exceeds a throughput monitor threshold provide more bandwidth to the data traffic from the particular department if more bandwidth is available. For example, a pharmacy may have an online photo developing department. A rush of photo orders may come in that need to be delivered electronically. The data traffic information may indicate that the amount of data traffic from the photo department exceeds the throughput monitor threshold and that extra bandwidth is available. As a result, the photo orders from the photo department may be prioritized over other data traffic.

In yet another example, the rule may be when data traffic from a particular application are detected, the data traffic from the particular application are given priority over other data traffic. For example, a user may be logged in remotely to work from home and the user's children may be playing an online video game. The data traffic information may detect that data traffic from the remote log in application is arriving and prioritize the data traffic from the remote log in application over data traffic from the video game application.

It should be noted that the above rules are only examples. Other rules may be included in the rules engine 114 and are within the scope of the present disclosure.

The gateway 114 may then process incoming and outgoing data packets in accordance with the data traffic shaping action. For example, data packets to and from the Internet 118 (e.g., a wide area network (WAN)) may be processed by the gateway 114 in accordance with the data traffic shaping action. The gateway 114 may be configured to look for data packets that are marked by the sensors 104 with a particular mark. The getaway 114 may identify the marked data packets and process the data packets in accordance with the data traffic shaping action.

In one embodiment, once a particular condition is no longer detected or the condition has expired, the AS 108 may send a second control signal to the gateway 114 to reset the configuration of the gateway 114. In other words, the second control signal may configure the gateway 114 to remove the data traffic shaping action such that the data traffic is processed on a first come first serve or a best effort basis.

It should be noted that the communication network 100 has been simplified for ease of explanation. The communication network 100 may include additional network elements or access networks that are not shown.

Figure 2:
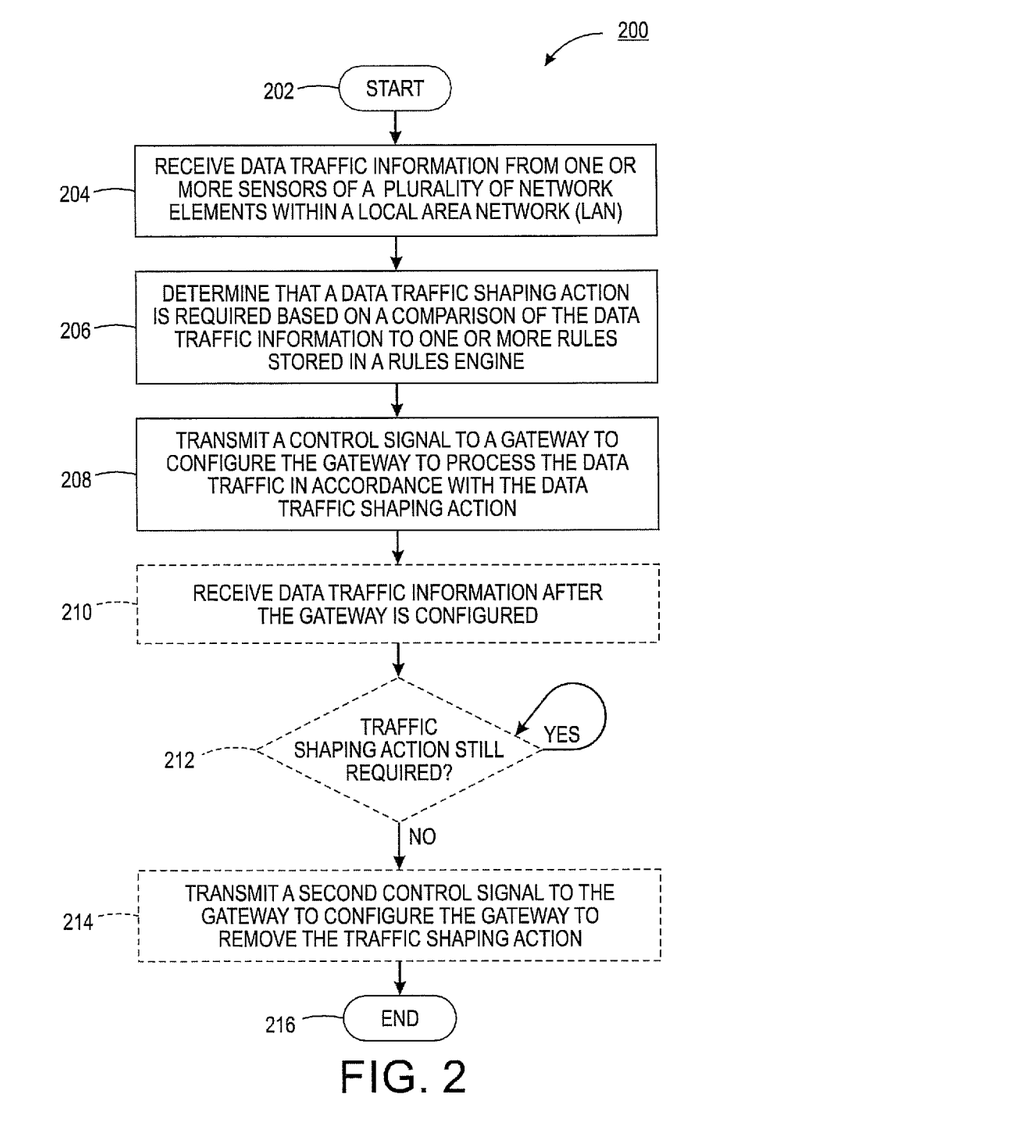
FIG. 2 illustrates a flowchart of an example method for shaping data traffic in a local area network (LAN)
Figure 4:
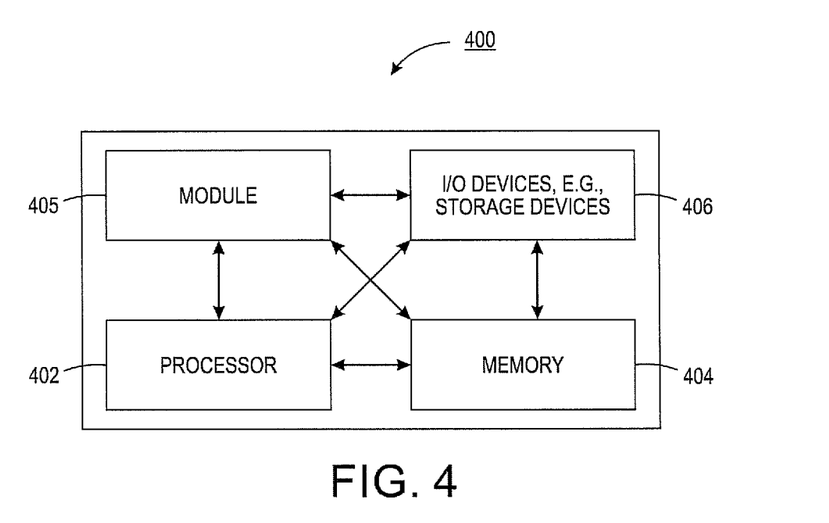
FIG. 4 illustrates a high-level block diagram of a computer suitable for use in performing the functions described herein.

FIG. 2 illustrates a flowchart of an example method 200 for shaping data traffic in a LAN. In one embodiment, one or more steps or operations of the method 200 may be performed by the AS 104 or a computer as illustrated in FIG. 4 and discussed below.

At block 202 the method 200 begins. At block 204, the method 200 receives data traffic information from one or more sensors of a plurality of network elements within a local area network (LAN). For example, the data packets within the data traffic may each be marked with a particular application on an endpoint that generated the data packet, a location of the endpoint, what department of retailer the data packet came from, a user associated with the endpoint, and the like. The amount of data traffic from a particular endpoint, application or department may be tracked by the one or more sensors and transmitted to an application server.

At block 206, the method 200 may determine that a data traffic shaping action is required based on a comparison of the data traffic information to a rules engine. For example, the rules engine may contain a list of various if/then type rules. When a particular type of data traffic information is received, then a particular data traffic shaping action may be triggered. The data traffic shaping action may determine how a gateway should be configured to handle data packets that come in to and out of the gateway.

Some examples of rules may include if an amount of data traffic from a particular endpoint exceeds a throughput monitor threshold, then the data traffic marked as being from the particular endpoint may be prioritized. For example, a particular department in a retailer may require additional bandwidth to execute a large order.

In another example, data from a particular application within a retailer may be prioritized over all other traffic during a particular time of day. For example, a pharmacy may prioritize data traffic from a prescription filling application during afternoon hours where online prescription orders are at a peak rate.

In yet another example, if an amount of data traffic from a particular endpoint exceeds a throughput monitor threshold, then the data traffic marked as being from the particular endpoint may be throttled. For example, a landlord wanting to prevent a single user from monopolizing the bandwidth may throttle the user to free up bandwidth for other users. Other example rules may be used and are within the scope of the present disclosure.

At block 208, the method 200 may transmit a control signal to a gateway to configure the gateway to process the data traffic in accordance with the data traffic shaping action. For example, the gateway may be configured to recognize and prioritize or deprioritize certain data packets based on the mark added by the one or more sensors. Using the mark added by the one or more sensors may help to provide more detailed information and more control over what data packets are prioritized compared to using traditional information found in the data packet. For example, IP address, MAC address, port numbers and the like may provide a limited amount of information.

In addition, using the mark may provide a more efficient process than obtaining the IP address, MAC address and the like from the data packet. For example, the sensor may simply tag or mark the data packet (e.g., use a single bit binary value of 0 or 1) to indicate whether the data traffic shaping action should be applied to the data packet. In one embodiment, the mark may include detailed information about a specific application used to generate the data packet, a department within a retailer that generated the data packet, and the like.

At optional block 210, the method 200 may receive data traffic information after the gateway is configured. In other words, the data traffic information may continuously be monitored.

At optional block 212, the method 200 may determine if the traffic shaping action is still required. If the answer is "yes," the method 200 may continue to spin at block 212. However, if the answer is "no" the method 200 may proceed to optional block 214.

At optional block 214, the method 200 may transmit a second control signal to the gateway to configure the gateway to remove the traffic shaping action. For example, the gateway may be configured back to the initial configuration. The initial configuration may be a first come first serve, a best effort, and the like, processing of data packets or a best effort. At block 216 the method 200 ends.

Figure 3:
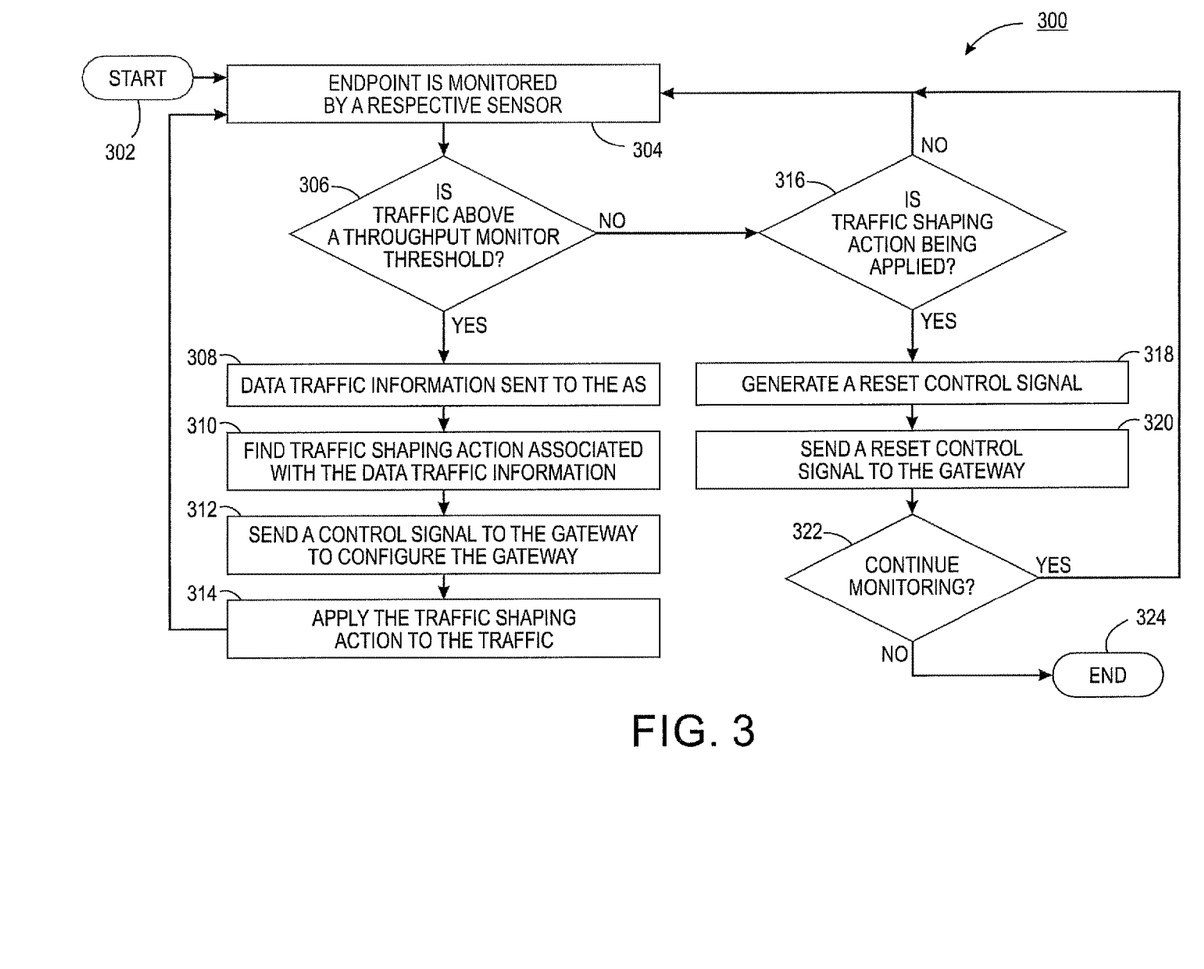
FIG. 3 illustrates a flowchart of another example method for shaping data traffic in a local area network (LAN)

FIG. 3 illustrates a more detailed flowchart of an example method 300 for shaping data traffic in a LAN. In one embodiment, one or more steps or operations of the method 300 may be performed by a system that includes the endpoint 102, the AS 104, the gateway 114 and/or a computer as illustrated in FIG. 4 and discussed below.

At block 302, the method 300 begins. At block 304, the method 300 monitors an endpoint by a respective sensor. For example, the respective sensor may collect information about the data packet generated by the endpoint or a particular application running on the endpoint.

At block 306, the method 300 determines if the traffic (e.g., an amount of data traffic) is above a throughput monitor threshold. The throughput monitor threshold may be predefined by a user. For example, the throughput monitor threshold may be 50% of a total amount of bandwidth or a value (e.g., 50 megabytes per second (Mbps), and the like. In one embodiment, the throughput monitor threshold may be compared to an amount of traffic from a particular endpoint, from a particular application, from a particular group of endpoints, from a particular department of a retailer, and the like.

If the answer to block 306 is "yes," the method 300 may proceed to block 308. At block 308, the method 300 may send data traffic information to the AS 104.

At block 310, the method 300 may find a traffic shaping action associated with the data traffic information. For example, the data traffic information may be compared to a rules engine.

At block 312, the method 300 may send a control signal to the gateway to configure the gateway. For example, the control signal may be based on a data traffic shaping action that is found in the rules engine based on the comparison of the data traffic information to the rules engine.

At block 314, the method 300 may apply the traffic shaping action to the traffic. For example, the reconfigured gateway may process the incoming and outgoing data packets in the data traffic in accordance with the data traffic shaping action. The method 300 may then return to block 304 to continuously monitor the endpoint.

Referring back to block 306, if the answer to block 306 is "no," the method 300 may proceed to block 316. At block 316, the method 300 may determine if a data traffic shaping action is being applied. If the answer to block 316 is "no," then the method 300 may return to block 304 to continuously monitor the endpoint.

However, if the answer to block 316 is "yes," then the method 300 may proceed to block 318. At block 318, the method 300 may generate a reset control signal. For example, the AS may determine that the data traffic shaping action is no longer required based on the data traffic information that is received from the sensor.

At block 320, the method 300 sends the reset control signal to the gateway. For example, the gateway may be reconfigured to an initial configuration that does not apply the data traffic shaping action.

At block 322, the method 300 determines whether the endpoint should continue to be monitored. If the answer is "yes," the method 300 may return to block 304 to continue monitoring the endpoint. If the answer is "no," the method 300 may proceed to block 324. At block 324, the method 300 ends.

It should be noted that although not explicitly specified, one or more steps, functions, or operations of the methods 200 and 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIGS. 2 and 3 that recite a determining operation, or involve a decision, do not necessarily require that both branches of the determining operation be practiced. In other words, one of the branches of the determining operation can be deemed as an optional step.

FIG. 4 depicts a high-level block diagram of a computer that can be transformed to into a machine that is dedicated to perform the functions described herein. As a result, the embodiments of the present disclosure improve the operation and functioning of the computer to improve shaping data traffic in a LAN, as disclosed herein.

As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for shaping data traffic in a LAN, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for shaping data traffic in a LAN (e.g., a software program comprising computer-executable instructions) can be loaded into memory 404 and executed by hardware processor element 402 to implement the steps, functions or operations as discussed above in connection with the exemplary methods 200 and 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for shaping data traffic in a LAN (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for shaping outgoing data traffic in a local area network (LAN), the method comprising:

transmitting data traffic information from one or more sensors of a plurality of endpoints within the LAN to an application server;

determining, by the application server, that a data traffic shaping action is required based on a comparison of the data traffic information to one or more customized rules stored in a rules engine, wherein the one or more customized rules are defined by a customer for a gateway for the outgoing data traffic from the plurality of endpoints within the LAN, wherein the one or more customized rules defined by the customer comprise prioritizing the outgoing data traffic from a particular endpoint within the LAN during a particular time of day when a timestamp of the outgoing data traffic is during the particular time of day;

transmitting, by the application server, a control signal to the gateway;

configuring the gateway, in response to the control signal from the application server, to process the outgoing data traffic in accordance with the data traffic shaping action, wherein the gateway processes the outgoing data traffic in accordance with the data traffic shaping action based on data packets that are marked with a single binary value by a sensor of one of the plurality of endpoints;

detecting by the application server that a condition for the data traffic shaping action has expired and transmitting a second control signal to the gateway; and configuring the gateway, in response to the second control signal from the application server to remove the data traffic shaping action and process subsequent data traffic on a best effort basis.

2. The method of claim 1, wherein the sensor of the one or more sensors is associated with each one of the plurality of endpoints within the LAN.

3. The method of claim 1, wherein receiving the transmitted data traffic information comprises tracking an amount of the outgoing data traffic that is from a particular department of a retailer.

4. The method of claim 1, wherein receiving the transmitted data traffic information comprises tracking an amount of the outgoing data traffic that is from an application being executed on an endpoint device that originated the outgoing data traffic.

5. The method of claim 4, wherein a respective sensor of the one or more sensors marks a data packet with identification information of the application.

6. The method of claim 5, wherein the data traffic shaping action comprises prioritizing a subset of the outgoing data traffic that is marked with the application.

7. The method of claim 1, wherein the data traffic information is received from one or more sensors of the plurality of endpoints via a communication interface of the application server and the control signal is transmitted to the gateway via the communication interface of the application server.

8. A method for shaping outgoing data traffic in a local area network (LAN), the method comprising:
    transmitting the outgoing data traffic comprising a plurality of data packets from a plurality of different endpoint devices within the LAN to an application server, wherein each one of the plurality of data packets is marked with an application that created a respective data packet of the plurality of data packets by a respective sensor on each one of the plurality of different endpoint devices;
    determining, by the application server, that a subset of the plurality of packets of the outgoing data traffic has priority based on a comparison of a number of the subset of the plurality of packets of the outgoing data traffic that is tracked to one or more customized rules stored in a rules engine, wherein the one or more customized rules are defined by a customer for a gateway for the outgoing data traffic from the plurality of different endpoint devices within the LAN, wherein the one or more customized rules defined by the customer comprise prioritizing the outgoing data traffic from a particular endpoint within the LAN during a particular time of day when a timestamp of the outgoing data traffic is during the particular time of day;
    transmitting, by the application server, a control signal to the gateway;
    configuring the gateway, in response to the control signal from the application server, to process the subset of the plurality of data packets of the outgoing data traffic that is marked before all other data packets, wherein the gateway processes the outgoing data traffic in accordance with the data traffic shaping action based on data packets that are marked with a single binary value by a sensor of one of the plurality of different endpoint devices;
    detecting by the application server that a condition for the data traffic shaping action has expired and transmitting a second control signal to the gateway; and
    configuring the gateway, in response to the second control signal from the application server to remove the outgoing data traffic shaping action and process subsequent outgoing data traffic on a best effort basis.

9. The method of claim 8, wherein the subset of the plurality of packets is prioritized when the number of the subset of the plurality of packets from the application executed on an endpoint exceeds a threshold.

10. The method of claim 8, wherein the application is associated with a particular department of a retailer.

11. A system to perform operations for shaping outgoing data traffic in a local area network (LAN), comprising:
    a plurality of endpoints within the LAN to transmit data traffic information from one or more sensors of the plurality of endpoints;
    a gateway in communication with the plurality of endpoints to process data traffic from the plurality of endpoints; and
    an application server in communication with the plurality of endpoints to receive the data traffic information and the gateway to control a configuration of the gateway, wherein the application server is to determine that a data traffic shaping action is required based on a comparison of the data traffic information to one or more customized rules stored in a rules engine, wherein the one or more customized rules are defined by a customer for the gateway for the outgoing data traffic from the plurality of endpoints within the LAN, wherein the one or more customized rules defined by the customer comprise prioritizing the outgoing data traffic from a particular endpoint within the LAN during a particular time of day when a timestamp of the outgoing data traffic is during the particular time of day, to transmit a control signal to the gateway to configure the gateway to process the outgoing data traffic in accordance with the data traffic shaping action, wherein the gateway processes the outgoing data traffic in accordance with the data traffic shaping action based on data packets that are marked with a single binary value by a sensor of one of the plurality of endpoints, to detect that a condition for the data traffic shaping action has expired and transmitting a second control signal to the gateway to configure the gateway to remove the data traffic shaping action and process subsequent data traffic on a best effort basis.

* * * * *